United States Patent [19]

Gottlieb et al.

[11] 4,160,578

[45] Jul. 10, 1979

[54] ANNULAR REFLECTOR FOR MICROSCOPE OBJECTIVE

[75] Inventors: Nathan Gottlieb, Kenmore; Milton H. Sussman, Amherst, both of N.Y.

[73] Assignee: American Optical Corporation, Southbridge, Mass.

[21] Appl. No.: 896,969

[22] Filed: Apr. 17, 1978

[51] Int. Cl.² ............................................. G02B 21/10
[52] U.S. Cl. ......................................... 350/89; 350/91
[58] Field of Search ............................ 350/91, 296, 89

[56] References Cited

U.S. PATENT DOCUMENTS

| | | | |
|---|---|---|---|
| 1,943,510 | 1/1934 | Bauersfeld et al. | 350/91 |
| 1,985,072 | 12/1934 | Bauersfeld | 350/91 |
| 2,079,621 | 5/1937 | Land | 350/91 |

Primary Examiner—Jon W. Henry
Attorney, Agent, or Firm—Jeremiah J. Duggan; Alan H. Spencer; Stephen Schneeberger

[57] ABSTRACT

The annular reflector for a dark-field, vertically-illuminated microscope objective must have a peculiar curvature to obtain a uniform distribution of the light on the object surface being viewed. Four reflectors are disclosed. Each reflector is suitable for use in a respective microscope objective.

4 Claims, 2 Drawing Figures

ANNULAR REFLECTOR FOR MICROSCOPE OBJECTIVE

BACKGROUND OF THE INVENTION

This invention relates to dark-field microscope objectives and more particularly to annular reflectors providing uniform illumination for vertical dark-field microscopy.

PRIOR ART

U.S. Pat. No. 1,943,509 issued Jan. 16, 1934 to Bauersfeld describes a vertical dark-field illuminator. The illuminator has an annular reflector above an objective to deflect the light toward the object and a co-axial annular condenser lens to focus the light on the object. The Bauersfeld's condenser lens also reflects the light off an exterior surface before refracting the light as it leaves the lens.

U.S. Pat. No. 2,059,781 issued Nov. 3, 1936 to Ellestad. This patent discloses an annular reflector and a co-axial condenser lens which only refracts the light to focus it on the object.

U.S. Pat. No. 1,996,920, issued Apr. 9, 1935 to Hauser. This patent discloses a revolving nose piece for microscopes having a pure reflective surface to direct co-axial illumination onto an object for dark-field microscopy. No curvatures are taught for the reflecting surface.

U.S. Pat. No. 2,357,378 issued Sept. 5, 1944 to Benford. This patent discloses a solid transparent condenser surrounding an objective which utilizes both refraction (curve surfaces) and reflection to focus the light on the object. The patent does not teach any curves.

U.S. Pat. No. 3,857,626 issued Dec. 31, 1974 to Rosenberger et al. The patent describes a beam reducer to concentrate light from the illumination system into a condenser system of smaller diameter than the beam. No parameters of the condenser are taught although the structure appears to be substantially the same as that taught by Benford.

SUMMARY OF THE INVENTION AND BRIEF DESCRIPTION OF THE DRAWING

The present invention is directed to annular reflectors to be positioned co-axially aligned with the object end of a microscope objective to uniformly illuminate the object surface being viewed. The curvature of the reflecting surface must have specific radii in order to distribute light reflected therefrom uniformly on the object surface. Four species of the invention are defined by point reference.

FIG. 1 is a side view, partly in section, of a representative microscope objective having an annular reflector according to the present invention and FIG. 2 is a side view in section of an annular reflector according to the present invention.

DETAILED DESCRIPTION OF THE PRESENT INVENTION AND PREFERRED EMBODIMENTS

Figure 1:
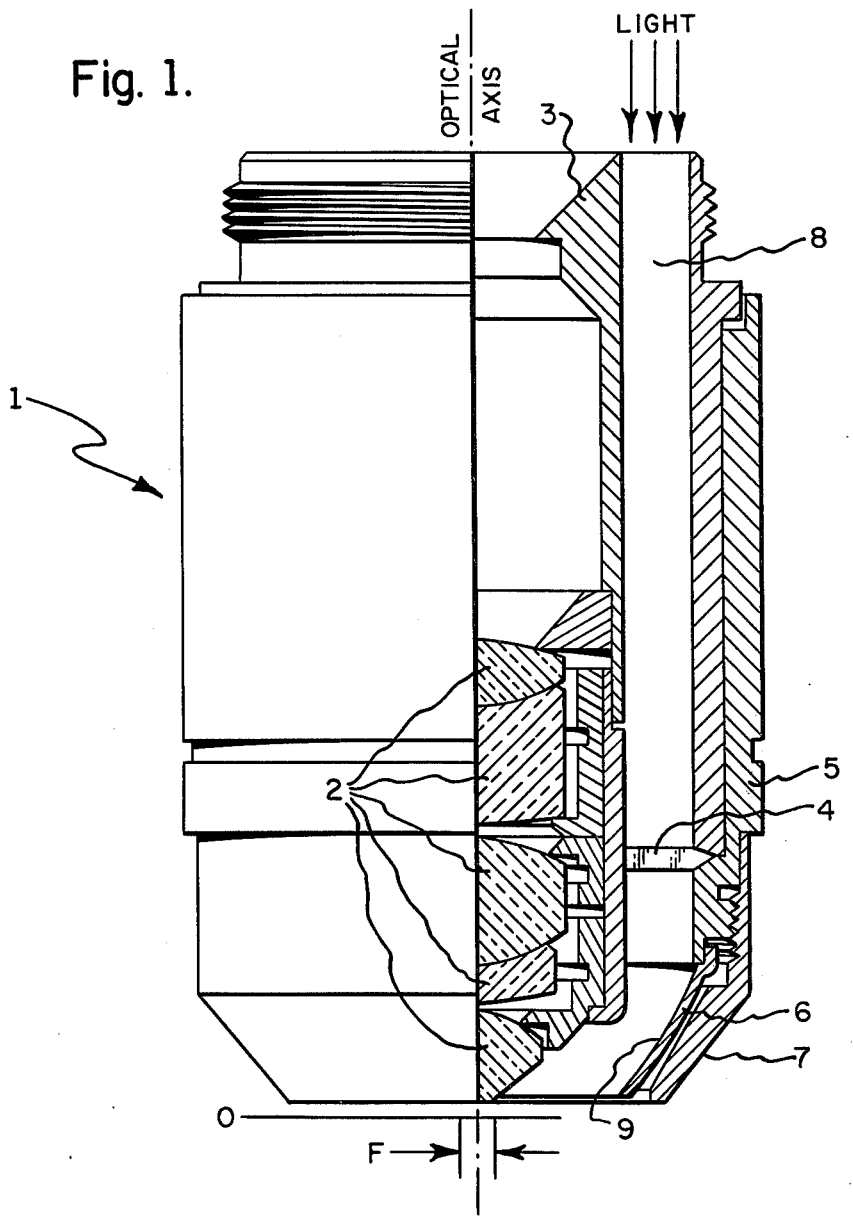
Figure 2:
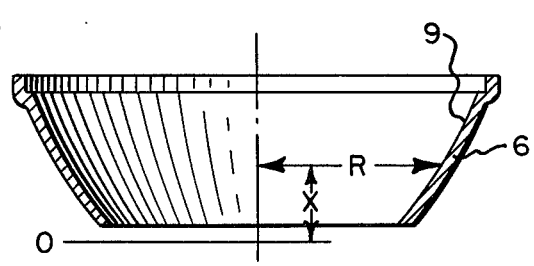

Referring to FIG. 1, a microscope objective shown generally at 1, has a plurality of lenses 2, supported in a central barrel assembly 3, which is supported in turn by radially extending supports (one shown) within tube assembly 5. Annular reflector 6 is carried by tube assembly 5 within protective shield 7. Light passing through the cylindrical opening 8 between barrel assembly 3 and tube assembly 5 is deflected by reflecting surface 9 of annular reflector 6 to an area having a diameter F on object O.

The radii for the reflector suitable for use with an objective having a power of 6.5×, a numerical aperture of 0.15, and a working distance of 18.35 mm are given in Table I.

TABLE I

| Axial Distance From Object Inches | Axial Radius to Reflecting Surface Inches | Axial Distance From Object Inches | Axial Radius to Reflecting Surface Inches |
| --- | --- | --- | --- |
| .420 | .2320 | .472 | .2419 |
| .422 | .2324 | .474 | .2423 |
| .424 | .2328 | .476 | .2426 |
| .426 | .2332 | .478 | .2430 |
| .428 | .2336 | .480 | .2434 |
| .430 | .2339 | .482 | .2438 |
| .432 | .2343 | .484 | .2441 |
| .434 | .2347 | .486 | .2445 |
| .436 | .2351 | .488 | .2449 |
| .438 | .2355 | .490 | .2453 |
| .440 | .2359 | .492 | .2456 |
| .442 | .2362 | .494 | .2460 |
| .444 | .2366 | .496 | .2464 |
| .446 | .2370 | .498 | .2467 |
| .448 | .2374 | .500 | .2471 |
| .450 | .2378 | .502 | .2475 |
| .452 | .2381 | .504 | .2478 |
| .454 | .2385 | .506 | .2482 |
| .456 | .2389 | .508 | .2486 |
| .458 | .2393 | .510 | .2490 |
| .460 | .2396 | .512 | .2493 |
| .462 | .2400 | .514 | .2497 |
| .464 | .2404 | .516 | .2501 |
| .466 | .2408 | .518 | .2504 |
| .468 | .2411 | .520 | .2508 |
| .470 | .2415 | .522 | .2512 |
| .524 | .2515 | .576 | .2609 |
| .526 | .2519 | .578 | .2613 |
| .528 | .2523 | .580 | .2617 |
| .530 | .2526 | .582 | .2620 |
| .532 | .2530 | .584 | .2624 |
| .534 | .2533 | .586 | .2627 |
| .536 | .2537 | .588 | .2631 |
| .538 | .2541 | .590 | .2635 |
| .540 | .2544 | .592 | .2638 |
| .542 | .2548 | .594 | .2642 |
| .544 | .2552 | .596 | .2645 |
| .546 | .2555 | .598 | .2649 |
| .548 | .2559 | .600 | .2652 |
| .550 | .2563 | .602 | .2656 |
| .552 | .2566 | .604 | .2660 |
| .544 | .2570 | .606 | .2663 |
| .556 | .2573 | .608 | .2667 |
| .558 | .2577 | .610 | .2670 |
| .560 | .2581 | .612 | .2674 |
| .562 | .2584 | .614 | .2677 |
| .564 | .2588 | .616 | .2681 |
| .566 | .2591 | .618 | .2685 |
| .568 | .2595 | .620 | .2688 |
| .570 | .2599 | .622 | .2692 |
| .572 | .2602 | .624 | .2695 |
| .574 | .2606 | .626 | .2699 |
| .628 | .2702 | .680 | .2794 |
| .630 | .2706 | .682 | .2798 |
| .632 | .2709 | .684 | .2801 |
| .634 | .2713 | .686 | .2805 |
| .636 | .2716 | .688 | .2808 |
| .638 | .2720 | .690 | .2812 |
| .640 | .2724 | .692 | .2815 |
| .642 | .2727 | .694 | .2819 |
| .644 | .2731 | .696 | .2822 |
| .646 | .2734 | .698 | .2826 |
| .648 | .2738 | .700 | .2829 |
| .650 | .2741 | .702 | .2833 |
| .652 | .2745 | .704 | .2836 |
| .654 | .2748 | .706 | .2840 |
| .656 | .2752 | .708 | .2843 |
| .658 | .2755 | .710 | .2847 |
| .660 | .2759 | .712 | .2851 |

TABLE I-continued

| Axial Distance From Object Inches | Axial Radius to Reflecting Surface Inches | Axial Distance From Object Inches | Axial Radius to Reflecting Surface Inches |
|---|---|---|---|
| .662 | .2762 | .714 | .2854 |
| .664 | .2766 | .716 | .2858 |
| .666 | .2769 | .718 | .2861 |
| .668 | .2773 | .720 | .2865 |
| .670 | .2776 | .722 | .2868 |
| .672 | .2780 | .724 | .2872 |
| .674 | .2784 | .726 | .2875 |
| .676 | .2787 | .728 | .2879 |
| .678 | .2791 | .730 | .2882 |
| .732 | .2886 | .784 | .2981 |
| .734 | .2889 | .786 | .2985 |
| .736 | .2893 | .788 | .2988 |
| .738 | .2897 | .790 | .2992 |
| .740 | .2900 | .792 | .2996 |
| .742 | .2904 | .794 | .3000 |
| .744 | .2907 | .796 | .3004 |
| .746 | .2911 | .798 | .3008 |
| .748 | .2914 | .800 | .3011 |
| .750 | .2918 | .802 | .3015 |
| .752 | .2922 | .804 | .3019 |
| .754 | .2925 | .806 | .3023 |
| .756 | .2929 | .808 | .3027 |
| .758 | .2932 | .810 | .3031 |
| .760 | .2936 | .812 | .3035 |
| .762 | .2940 | .814 | .3038 |
| .764 | .2943 | .816 | .3042 |
| .766 | .2947 | .818 | .3046 |
| .768 | .2951 | .820 | .3050 |
| .770 | .2954 | .822 | .3054 |
| .772 | .2958 | .824 | .3058 |
| .774 | .2962 | .826 | .3062 |
| .776 | .2966 | .828 | .3066 |
| .778 | .2969 | .830 | .3069 |
| .780 | .2973 | .832 | .3073 |
| .782 | .2977 | .834 | .3077 |
| .836 | .3081 | .888 | .3182 |
| .838 | .3085 | .890 | .3186 |
| .840 | .3089 | .892 | .3190 |
| .842 | .3093 | .894 | .3193 |
| .844 | .3097 | .896 | .3197 |
| .846 | .3100 | .898 | .3201 |
| .848 | .3104 | .900 | .3205 |
| .850 | .3108 | .902 | .3209 |
| .852 | .3112 | .904 | .3213 |
| .854 | .3116 | .906 | .3217 |
| .856 | .3120 | .908 | .3220 |
| .858 | .3124 | .910 | .3224 |
| .860 | .3128 | .912 | .3228 |
| .862 | .3131 | .914 | .3232 |
| .864 | .3135 | .916 | .3236 |
| .866 | .3139 | .918 | .3240 |
| .868 | .3143 | .920 | .3244 |
| .870 | .3147 | .922 | .3247 |
| .872 | .3151 | .924 | .3251 |
| .874 | .3155 | .926 | .3255 |
| .876 | .3159 | .928 | .3259 |
| .878 | .3162 | .930 | .3263 |
| .880 | .3166 | .932 | .3267 |
| .882 | .3170 | .934 | .3270 |
| .884 | .3174 | .936 | .3274 |
| .886 | .3178 | .938 | .3278 |
| .940 | .3282 | .992 | .3381 |
| .942 | .3286 | .994 | .3385 |
| .944 | .3290 | .996 | .3389 |
| .946 | .3293 | .998 | .3393 |
| .948 | .3297 | 1.000 | .3396 |
| .950 | .3301 | 1.002 | .3400 |
| .952 | .3305 | 1.004 | .3404 |
| .954 | .3309 | 1.006 | .3408 |
| .956 | .3313 | 1.008 | .3411 |
| .958 | .3316 | 1.010 | .3415 |
| .960 | .3320 | 1.012 | .3419 |
| .962 | .3324 | 1.014 | .3423 |
| .964 | .3328 | 1.016 | .3427 |
| .966 | .3332 | 1.018 | .3430 |
| .968 | .3336 | 1.020 | .3434 |
| .970 | .3339 | 1.022 | .3438 |
| .972 | .3343 | 1.024 | .3442 |
| .974 | .3347 | 1.026 | .3445 |
| .976 | .3351 | 1.028 | .3449 |
| .978 | .3355 | 1.030 | .3453 |
| .980 | .3358 | 1.032 | .3457 |
| .982 | .3362 | 1.034 | .3461 |
| .984 | .3366 | 1.036 | .3464 |
| .986 | .3370 | 1.038 | .3468 |
| .988 | .3374 | 1.040 | .3472 |
| .990 | .3377 | 1.042 | .3476 |
| 1.044 | .3479 | 1.096 | .3576 |
| 1.046 | .3483 | 1.098 | .3580 |
| 1.048 | .3487 | | |
| 1.050 | .3491 | | |
| 1.052 | .3494 | | |
| 1.054 | .3498 | | |
| 1.056 | .3502 | | |
| 1.058 | .3506 | | |
| 1.060 | .3509 | | |
| 1.062 | .3513 | | |
| 1.064 | .3517 | | |
| 1.066 | .3521 | | |
| 1.068 | .3524 | | |
| 1.070 | .3528 | | |
| 1.072 | .3532 | | |
| 1.074 | .3535 | | |
| 1.076 | .3539 | | |
| 1.078 | .3543 | | |
| 1.080 | .3547 | | |
| 1.082 | .3550 | | |
| 1.084 | .3554 | | |
| 1.086 | .3558 | | |
| 1.088 | .3561 | | |
| 1.090 | .3565 | | |
| 1.092 | .3569 | | |
| 1.094 | .3573 | | |

The radii for the reflector suitable for use with an objective having a power of 10×, a numerical aperture of 0.25, and a working distance of 10.209 mm are given in Table II.

TABLE II

| Axial Distance from Object Inches | Axial Radius to Reflecting Surface Inches | Axial Distance from Object Inches | Axial Radius to Reflecting Surface Inches |
|---|---|---|---|
| .246 | .2279 | .298 | .2445 |
| .248 | .2286 | .300 | .2451 |
| .250 | .2292 | .302 | .2458 |
| .252 | .2299 | .304 | .2464 |
| .254 | .2306 | .306 | .2470 |
| .256 | .2312 | .308 | .2476 |
| .258 | .2319 | .310 | .2482 |
| .260 | .2325 | .312 | .2488 |
| .262 | .2331 | .314 | .2494 |
| .264 | .2338 | .316 | .2501 |
| .266 | .2344 | .318 | .2507 |
| .268 | .2351 | .320 | .2513 |
| .270 | .2357 | .322 | .2519 |
| .272 | .2364 | .324 | .2525 |
| .274 | .2370 | .326 | .2531 |
| .276 | .2376 | .328 | .2537 |
| .278 | .2383 | .330 | .2543 |
| .280 | .2389 | .332 | .2549 |
| .282 | .2395 | .334 | .2555 |
| .284 | .2402 | .336 | .2561 |
| .286 | .2408 | .338 | .2567 |
| .288 | .2414 | .340 | .2573 |
| .290 | .2420 | .342 | .2579 |
| .292 | .2427 | .344 | .2585 |
| .294 | .2433 | .346 | .2591 |
| .296 | .2439 | .348 | .2597 |
| .350 | .2603 | .402 | .2754 |
| .352 | .2608 | .404 | .2759 |

TABLE II-continued

| Axial Distance from Object Inches | Axial Radius to Reflecting Surface Inches | Axial Distance from Object Inches | Axial Radius to Reflecting Surface Inches |
|---|---|---|---|
| .354 | .2614 | .406 | .2765 |
| .356 | .2620 | .408 | .2771 |
| .358 | .2626 | .410 | .2776 |
| .360 | .2632 | .412 | .2782 |
| .362 | .2638 | .414 | .2788 |
| .364 | .2644 | .416 | .2793 |
| .366 | .2650 | .418 | .2799 |
| .368 | .2655 | .420 | .2805 |
| .370 | .2661 | .422 | .2810 |
| .372 | .2667 | .424 | .2816 |
| .374 | .2673 | .426 | .2822 |
| .376 | .2679 | .428 | .2827 |
| .378 | .2684 | .430 | .2833 |
| .380 | .2690 | .432 | .2839 |
| .382 | .2696 | .434 | .2844 |
| .384 | .2701 | .436 | .2850 |
| .386 | .2708 | .438 | .2856 |
| .388 | .2713 | .440 | .2661 |
| .390 | .2719 | .442 | .2867 |
| .392 | .2725 | .444 | .2872 |
| .394 | .2731 | .446 | .2878 |
| .396 | .2736 | .448 | .2884 |
| .398 | .2742 | .450 | 2889 |
| .400 | .2748 | .452 | .2895 |
| .454 | .2901 | .506 | .3050 |
| .456 | .2906 | .508 | .3056 |
| .458 | .2912 | .510 | .3062 |
| .460 | .2917 | .512 | .3068 |
| .462 | .2923 | .414 | .3074 |
| .464 | .2929 | .516 | .3080 |
| .466 | .2934 | .518 | .3085 |
| .468 | .2940 | .520 | .3091 |
| .470 | .2946 | .522 | .3097 |
| .472 | .2951 | .524 | .3103 |
| .474 | .2957 | .526 | .3109 |
| .476 | .2963 | .528 | .3114 |
| .478 | .2969 | .530 | .3120 |
| .480 | .2975 | .532 | .3126 |
| .482 | .2980 | .534 | .3132 |
| .484 | .2986 | .536 | .3138 |
| .486 | .2992 | .538 | .3143 |
| .488 | .2998 | .540 | .3149 |
| .490 | .3004 | .542 | .3155 |
| .492 | .3010 | .544 | .3161 |
| .494 | .3015 | .546 | .3166 |
| .496 | .3021 | .548 | .3172 |
| .498 | .3027 | .550 | .3178 |
| .500 | .3033 | .552 | .3184 |
| .502 | .3039 | .554 | .3189 |
| .504 | .3045 | .556 | .3195 |
| .558 | .3201 | .614 | .3359 |
| .560 | .3207 | .616 | .3365 |
| .562 | .3212 | .618 | .3370 |
| .564 | .3218 | .620 | .3376 |
| .566 | .3324 | .622 | .3382 |
| .568 | .3229 | .624 | .3387 |
| .570 | .3235 | .626 | .3393 |
| .572 | .3241 | .628 | .3398 |
| .574 | .3247 | .630 | .3404 |
| .576 | .3252 | .632 | .3409 |
| .578 | .3258 | .634 | .3415 |
| .580 | .3264 | .636 | .3420 |
| .582 | .3269 | .638 | .3426 |
| .584 | .3275 | .640 | .3431 |
| .586 | .3281 | .642 | .3437 |
| .588 | .3286 | .644 | .3442 |
| .590 | .3292 | .646 | .3448 |
| .592 | .3298 | .648 | .3453 |
| .594 | .3303 | .650 | .3459 |
| .596 | .3309 | .652 | .3464 |
| .598 | .3314 | .654 | .3470 |
| .600 | .3320 | .656 | .3475 |
| .602 | .3326 | .658 | .3481 |
| .604 | .3331 | .660 | .3486 |
| .606 | .3337 | .662 | .3492 |
| .608 | .3342 | .664 | .3497 |
| .610 | .3348 | .666 | .3503 |
| .612 | .3354 | .668 | .3508 |
| .670 | .3514 | | |
| .672 | .3519 | | |
| .674 | .3524 | | |
| .676 | .3530 | | |
| .678 | .3535 | | |
| .680 | .3541 | | |
| .682 | .3546 | | |
| .684 | .3552 | | |
| .686 | .3557 | | |
| .688 | .3562 | | |
| .690 | .3568 | | |
| .692 | .3573 | | |
| .694 | .3579 | | |
| .696 | .3584 | | |
| .698 | .3589 | | |
| .700 | .3595 | | |

The radii for the reflector suitable for use with an objective having a power of 20×, a numerical aperture of 0.50, and a working distance of 1.586 mm are given in Table III.

TABLE III

| Axial Distance from Object Inches | Axial Radius to Reflecting Surface Inches | Axial Distance from Object Inches | Axial Radius to Reflecting Surface Inches |
|---|---|---|---|
| 0.066 | 0.2288 | 0.116 | 0.2626 |
| .068 | .2302 | .118 | .2638 |
| .070 | .2316 | .120 | .2651 |
| .072 | .2331 | .122 | .2664 |
| .074 | .2345 | .124 | .2676 |
| .076 | .2359 | .126 | .2688 |
| .078 | .2373 | .128 | .2701 |
| .080 | .2387 | .130 | .2713 |
| .082 | .2401 | .132 | .2725 |
| .084 | .2415 | .134 | .2738 |
| .086 | .2429 | .136 | .2750 |
| .088 | .2442 | .138 | .2762 |
| .090 | .2456 | .140 | .2774 |
| .092 | .2469 | .142 | .2786 |
| .094 | .2483 | .144 | .2798 |
| .096 | .2496 | .146 | .2810 |
| .098 | .2509 | .148 | .2822 |
| .100 | .2522 | .150 | .2834 |
| .102 | .2536 | .152 | .2845 |
| .104 | .2549 | .154 | .2857 |
| .106 | .2562 | .156 | .2869 |
| .108 | .2575 | .158 | .2881 |
| .110 | .2588 | .160 | .2892 |
| .112 | .2600 | .162 | .2904 |
| .114 | .2613 | .164 | .2915 |
| 0.166 | 0.2927 | 0.216 | 0.3209 |
| .168 | .2939 | .218 | .3220 |
| .170 | .2950 | .220 | .3231 |
| .172 | .2962 | .222 | .3242 |
| .174 | .2973 | .224 | .3253 |
| .176 | .2985 | .226 | .3263 |
| .178 | .2996 | .228 | .3274 |
| .180 | .3008 | .230 | .3285 |
| .182 | .3019 | .232 | .3296 |
| .184 | .3031 | .234 | .3306 |
| .186 | .3042 | .236 | .3317 |
| .188 | .3053 | .238 | .3328 |
| .190 | .3064 | .240 | .3338 |
| .192 | .3076 | .242 | .3349 |
| .194 | .3087 | .244 | .3359 |
| .196 | .3098 | .246 | .3370 |
| .198 | .3110 | .248 | .3380 |
| .200 | .3121 | .250 | .3391 |
| .202 | .3132 | .252 | .3401 |
| .204 | .3143 | .254 | .3412 |
| .206 | .3154 | .256 | .3422 |
| .208 | .3165 | .258 | .3432 |

TABLE III-continued

| Axial Distance from Object Inches | Axial Radius to Reflecting Surface Inches | Axial Distance from Object Inches | Axial Radius to Reflecting Surface Inches |
|---|---|---|---|
| .210 | .3176 | .260 | .3443 |
| .212 | .3187 | .262 | .3453 |
| .214 | .3198 | .264 | .3463 |
| 0.266 | 0.3474 | | |
| .268 | .3484 | | |
| .270 | .3494 | | |
| .272 | .3504 | | |
| .274 | .3514 | | |
| .276 | .3524 | | |
| 2.78 | .3535 | | |
| .280 | .3545 | | |
| .282 | .3555 | | |
| .284 | .3565 | | |
| .286 | .3575 | | |
| .288 | .3585 | | |
| .290 | .3595 | | |

The radii for the reflector suitable for use with an objective having a power of 40×, a numerical aperture of 0.66, and a working distance of 0.654 mm are given in Table IV.

TABLE IV

| Axial Distance from Object Inches | Axial Radius to Reflecting Surface Inches | Axial Distance from Object Inches | Axial Radius to Reflecting Surface Inches |
|---|---|---|---|
| 0.024 | 0.2299 | 0.074 | 0.2710 |
| .026 | .2317 | .076 | .2725 |
| .028 | .2335 | .078 | .2740 |
| .030 | .2353 | 0.80 | .2755 |
| .032 | .2370 | .082 | .2770 |
| .034 | .2387 | .084 | .2784 |
| .036 | .2404 | .086 | .2799 |
| .038 | .2422 | .088 | .2814 |
| .040 | .2438 | .090 | .2828 |
| .042 | .2455 | .092 | .2843 |
| .044 | .2472 | .094 | .2857 |
| .046 | .2488 | .096 | .2872 |
| .048 | .2505 | 0.98 | .2886 |
| .050 | .2521 | .100 | .2900 |
| .052 | .2538 | .102 | .2914 |
| .054 | .2554 | .104 | .2929 |
| .056 | .2570 | .106 | .2943 |
| .058 | .2586 | .108 | .2957 |
| .060 | .2601 | .110 | .2971 |
| .062 | .2617 | .112 | .2985 |
| .064 | .2633 | .114 | .2998 |
| .066 | .2648 | .116 | .3012 |
| .068 | .2664 | .118 | .3026 |
| .070 | .2679 | .120 | .3040 |
| .072 | .2695 | .122 | .3053 |
| 0.124 | 0.3067 | 0.174 | 0.3391 |
| .126 | .3080 | .176 | .3403 |
| .128 | .3094 | .178 | .3415 |
| .130 | .3107 | .180 | .3428 |
| .132 | .3121 | .182 | .3440 |
| .134 | .3134 | .184 | .3452 |
| .136 | .3147 | .186 | .3464 |
| .138 | .3161 | .188 | .3476 |
| .140 | .3174 | .190 | .3488 |
| .142 | .3187 | .192 | .3500 |
| .144 | .3200 | .194 | .3512 |
| .146 | .3213 | .196 | .3524 |
| .148 | .3226 | .198 | .3536 |
| .150 | .3239 | .200 | .3548 |
| .152 | .3252 | .202 | .3560 |
| .154 | .3265 | .204 | .3572 |
| .156 | .3277 | .206 | .3584 |
| .158 | .3290 | .208 | .3595 |
| .160 | .3303 | | |
| .162 | .3316 | | |
| .164 | .3328 | | |
| .166 | .3341 | | |
| .168 | .3353 | | |

TABLE IV-continued

| Axial Distance from Object Inches | Axial Radius to Reflecting Surface Inches | Axial Distance from Object Inches | Axial Radius to Reflecting Surface Inches |
|---|---|---|---|
| .170 | .3366 | | |
| .172 | .3378 | | |

What is claimed is:

1. In a dark-field, vertically-illuminated microscope objective having an effective power of 6.5×, a numerical aperture of 0.15, and a working distance of 18.35 mm the improvement comprising an annular reflector for providing substantially uniform object illumination having the following parameters.

| Axial Distance from Object Inches | Axial Radius to Reflecting Surface Inches | Axial Distance from Object Inches | Axial Radius to Reflecting Surface inches |
|---|---|---|---|
| .420 | .2320 | .472 | .2419 |
| .422 | .2324 | .474 | .2423 |
| .424 | .2328 | .476 | .2426 |
| .426 | .2332 | .478 | .2430 |
| .428 | .2336 | .480 | .2434 |
| .430 | .2339 | .482 | .2438 |
| .432 | .2343 | .484 | .2441 |
| .434 | .2347 | .486 | .2445 |
| .436 | .2351 | .488 | .2449 |
| .438 | .2355 | .490 | .2453 |
| .440 | .2359 | .492 | .2456 |
| .442 | .2362 | .494 | .2460 |
| .444 | .2366 | .496 | .2464 |
| .446 | .2370 | .498 | .2467 |
| .448 | .2374 | .500 | .2471 |
| .450 | .2378 | .502 | .2475 |
| .452 | .2381 | .504 | .2478 |
| .454 | .2385 | .506 | .2482 |
| .456 | .2389 | .508 | .2486 |
| .458 | .2393 | .510 | .2490 |
| .460 | .2396 | .512 | .2493 |
| .462 | .2400 | .514 | .2497 |
| .464 | .2404 | .516 | .2501 |
| .466 | .2408 | .518 | .2504 |
| .468 | .2411 | .520 | .2508 |
| .470 | .2415 | .522 | .2512 |
| .524 | .2515 | .576 | .2609 |
| .526 | .2519 | .578 | .2613 |
| .528 | .2523 | .580 | .2617 |
| .530 | .2526 | .582 | .2620 |
| .532 | .2530 | .584 | .2624 |
| .534 | .2533 | .586 | .2627 |
| .536 | .2537 | .588 | .2631 |
| .538 | .2541 | .590 | .2635 |
| .540 | .2544 | .592 | .2638 |
| .542 | .2548 | .594 | .2642 |
| .544 | .2552 | .596 | .2645 |
| .546 | .2555 | .598 | .2649 |
| .548 | .2559 | .600 | .2652 |
| .550 | .2563 | .602 | .2656 |
| .552 | .2566 | .604 | .2660 |
| .554 | .2570 | .606 | .2663 |
| .556 | .2573 | .608 | .2667 |
| .558 | .2577 | .610 | .2670 |
| .560 | .2581 | .612 | .2674 |
| .562 | .2584 | .614 | .2677 |
| .564 | .2588 | .616 | .2681 |
| .566 | .2591 | .618 | .2685 |
| .568 | .2595 | .620 | .2688 |
| .570 | .2599 | .622 | .2692 |
| .572 | .2602 | .624 | .2695 |
| .574 | .2606 | .626 | .2699 |
| .628 | .2702 | .680 | .2794 |
| .630 | .2706 | .682 | .2798 |
| .632 | .2709 | .684 | .2801 |
| .634 | .2713 | .686 | .2805 |
| .636 | .2716 | .688 | .2808 |

-continued

| Axial Distance from Object Inches | Axial Radius to Reflecting Surface Inches | Axial Distance from Object Inches | Axial Radius to Reflecting Surface inches |
|---|---|---|---|
| .638 | .2720 | .690 | .2812 |
| .640 | .2724 | .692 | .2815 |
| .642 | .2727 | .694 | .2819 |
| .644 | .2731 | .696 | .2822 |
| .646 | .2734 | .698 | .2826 |
| .648 | .2738 | .700 | .2829 |
| .650 | .2741 | .702 | .2833 |
| .652 | .2745 | .704 | .2836 |
| .654 | .2748 | .706 | .2840 |
| .656 | .2752 | .708 | .2843 |
| .658 | .2755 | .710 | .2847 |
| .660 | .2759 | .712 | .2851 |
| .662 | .2762 | .714 | .2854 |
| .664 | .2766 | .716 | .2858 |
| .666 | .2769 | .718 | .2861 |
| .668 | .2773 | .720 | .2865 |
| .670 | .2776 | .722 | .2868 |
| .672 | .2780 | .724 | .2872 |
| .674 | .2784 | .726 | .2875 |
| .676 | .2787 | .728 | .2879 |
| .678 | .2791 | .730 | .2882 |
| .732 | .2886 | .784 | .2981 |
| .734 | .2889 | .786 | .2985 |
| .736 | .2893 | .788 | .2988 |
| .738 | .2897 | .790 | .2992 |
| .740 | .2900 | .792 | .2996 |
| .742 | .2904 | .794 | .3000 |
| .744 | .2907 | .796 | .3004 |
| .746 | .2911 | .798 | .3008 |
| .748 | .2914 | .800 | .3011 |
| .750 | .2918 | .802 | .3015 |
| .752 | .2922 | .804 | .3019 |
| .754 | .2925 | .806 | .3023 |
| .756 | .2929 | .808 | .3027 |
| .758 | .2932 | .810 | .3031 |
| .760 | .2936 | .812 | .3035 |
| .762 | .2940 | .814 | .3038 |
| .764 | .2943 | .816 | .3042 |
| .766 | .2947 | .818 | .3046 |
| .768 | .2951 | .820 | .3050 |
| .770 | .2954 | .822 | .3054 |
| .772 | .2958 | .824 | .3058 |
| .774 | .2962 | .826 | .3062 |
| .776 | .2966 | .828 | .3066 |
| .778 | .2969 | .830 | .3069 |
| .780 | .2973 | .832 | .3073 |
| .782 | .2977 | .834 | .3077 |
| .836 | .3081 | .888 | .3182 |
| .838 | .3085 | .890 | .3186 |
| .840 | .3089 | .892 | .3190 |
| .842 | .3093 | .894 | .3193 |
| .844 | .3097 | .896 | .3197 |
| .846 | .3100 | .898 | .3201 |
| .848 | .3104 | .900 | .3205 |
| .850 | .3108 | .902 | .3209 |
| .852 | .3112 | .904 | .3213 |
| .854 | .3116 | .906 | .3217 |
| .856 | .3120 | .908 | .3220 |
| .858 | .3124 | .910 | .3224 |
| .860 | .3128 | .912 | .3228 |
| .862 | .3131 | .914 | .3232 |
| .864 | .3135 | .916 | .3236 |
| .866 | .3139 | .918 | .3240 |
| .868 | .3143 | .920 | .3244 |
| .870 | .3147 | .922 | .3247 |
| .872 | .3151 | .924 | .3251 |
| .874 | .3155 | .926 | .3255 |
| .876 | .3159 | .928 | .3259 |
| .878 | .3162 | .930 | .3263 |
| .880 | .3166 | .932 | .3267 |
| .882 | .3170 | .934 | .3270 |
| .884 | .3174 | .936 | .3274 |
| .886 | .3178 | .938 | .3278 |
| .940 | .3282 | .992 | .3381 |
| .942 | .3286 | .994 | .3385 |
| .944 | .3290 | .996 | .3389 |
| .946 | .3293 | .998 | .3393 |

-continued

| Axial Distance from Object Inches | Axial Radius to Reflecting Surface Inches | Axial Distance from Object Inches | Axial Radius to Reflecting Surface inches |
|---|---|---|---|
| .948 | .3297 | 1.000 | .3396 |
| .950 | .3301 | 1.002 | .3400 |
| .952 | .3305 | 1.004 | .3404 |
| .954 | .3309 | 1.006 | .3408 |
| .959 | .3313 | 1.008 | .3411 |
| .958 | .3316 | 1.010 | .3415 |
| .960 | .3320 | 1.012 | .3419 |
| .962 | .3324 | 1.014 | .3423 |
| .964 | .3328 | 1.016 | .3427 |
| .966 | .3332 | 1.018 | .3430 |
| .968 | .3336 | 1.020 | .3434 |
| .970 | .3339 | 1.022 | .3438 |
| .972 | .3343 | 1.024 | .3442 |
| .974 | .3347 | 1.026 | .3445 |
| .976 | .3351 | 1.028 | .3449 |
| .978 | .3355 | 1.030 | .3453 |
| .980 | .3358 | 1.032 | .3457 |
| .982 | .3362 | 1.034 | .3461 |
| .984 | .3366 | 1.036 | .3464 |
| .986 | .3370 | 1.038 | .3468 |
| .988 | .3374 | 1.040 | .3472 |
| .990 | .3377 | 1.042 | .3476 |
| 1.044 | .3479 | 1.096 | .3576 |
| 1.046 | .3483 | 1.098 | .3580 |
| 1.048 | .3487 | | |
| 1.050 | .3491 | | |
| 1.052 | .3494 | | |
| 1.054 | .3498 | | |
| 1.056 | .3502 | | |
| 1.058 | .3506 | | |
| 1.060 | .3509 | | |
| 1.062 | .3513 | | |
| 1.064 | .3517 | | |
| 1.066 | .3521 | | |
| 1.068 | .3524 | | |
| 1.070 | .3528 | | |
| 1.072 | .3532 | | |
| 1.074 | .3535 | | |
| 1.076 | .3539 | | |
| 1.078 | .3543 | | |
| 1.080 | .3547 | | |
| 1.082 | .3550 | | |
| 1.084 | .3554 | | |
| 1.086 | .3558 | | |
| 1.088 | .3561 | | |
| 1.090 | .3565 | | |
| 1.092 | .3569 | | |
| 1.094 | .3573 | | |

2. In a dark-field, vertically-illuminated microscope objective having an effective power of 10×, a numerical aperture of 0.25, and a working distance of 10.209 mm the improvement comprising an annular reflector for providing substantially uniform object illumination having the following parameters.

TABLE II

| Axial Distance from Object Inches | Axial Radius to Reflecting Surface Inches | Axial Distance from Object Inches | Axial Radius to Reflecting Surface Inches |
|---|---|---|---|
| .246 | .2279 | .298 | .2445 |
| .248 | .2286 | .300 | .2451 |
| .250 | .2292 | .302 | .2458 |
| .252 | .2299 | .304 | .2464 |
| .254 | .2306 | .306 | .2470 |
| .256 | .2312 | .308 | .2476 |
| .258 | .2319 | .310 | .2482 |
| .260 | .2325 | .312 | .2488 |
| .262 | .2331 | .314 | .2494 |
| .264 | .2338 | .316 | .2501 |
| .266 | .2344 | .318 | .2507 |
| .268 | .2351 | .320 | .2513 |

TABLE II-continued

| Axial Distance from Object (Inches) | Axial Radius to Reflecting Surface (Inches) | Axial Distance from Object (Inches) | Axial Radius to Reflecting Surface (Inches) |
|---|---|---|---|
| .270 | .2357 | .322 | .2519 |
| .272 | .2364 | .324 | .2525 |
| .274 | .2370 | .326 | .2531 |
| .276 | .2376 | .328 | .2537 |
| .278 | .2383 | .330 | .2543 |
| .280 | .2389 | .332 | .2549 |
| .282 | .2395 | .334 | .2555 |
| .284 | .2402 | .336 | .2561 |
| .286 | .2408 | .338 | .2567 |
| .288 | .2414 | .340 | .2573 |
| .290 | .2420 | .342 | .2579 |
| .292 | .2427 | .344 | .2585 |
| .294 | .2433 | .346 | .2591 |
| .296 | .2439 | .348 | .2597 |
| .350 | .2603 | .402 | .2754 |
| .352 | .2608 | .404 | .2759 |
| .354 | .2614 | .406 | .2765 |
| .356 | .2620 | .408 | .2771 |
| .358 | .2626 | .410 | .2776 |
| .360 | .2632 | .412 | .2782 |
| .362 | .2638 | .414 | .2788 |
| .364 | .2644 | .416 | .2793 |
| .366 | .2650 | .418 | .2799 |
| .368 | .2655 | .420 | .2805 |
| .370 | .2661 | .422 | .2810 |
| .372 | .2667 | .424 | .2816 |
| .374 | .2673 | .426 | .2822 |
| .376 | .2679 | .428 | .2827 |
| .378 | .2684 | .430 | .2833 |
| .380 | .2690 | .432 | .2839 |
| .382 | .2696 | .434 | .2844 |
| .384 | .2701 | .436 | .2850 |
| .386 | .2708 | .438 | .2856 |
| .388 | .2713 | .440 | .2661 |
| .390 | .2719 | .442 | .2867 |
| .392 | .2725 | .444 | .2872 |
| .394 | .2731 | .446 | .2878 |
| .396 | .2736 | .448 | .2884 |
| .398 | .2742 | .450 | 2889 |
| .400 | .2748 | .452 | .2895 |
| .454 | .2901 | .506 | .3050 |
| .456 | .2906 | .508 | .3056 |
| .458 | .2912 | .510 | .3062 |
| .460 | .2917 | .512 | .3068 |
| .462 | .2923 | .414 | .3074 |
| .464 | .2929 | .516 | .3080 |
| .466 | .2934 | .518 | .3085 |
| .468 | .2940 | .520 | .3091 |
| .470 | .2946 | .522 | .3097 |
| .472 | .2951 | .524 | .3103 |
| .474 | .2957 | .526 | .3109 |
| .476 | .2963 | .528 | .3114 |
| .478 | .2969 | .530 | .3120 |
| .480 | .2975 | .532 | .3126 |
| .482 | .2980 | .534 | .3132 |
| .484 | .2986 | .536 | .3138 |
| .486 | .2992 | .538 | .3143 |
| .488 | .2998 | .540 | .3149 |
| .490 | .3004 | .542 | .3155 |
| .492 | .3010 | .544 | .3161 |
| .494 | .3015 | .546 | .3166 |
| .496 | .3021 | .548 | .3172 |
| .498 | .3027 | .550 | .3178 |
| .500 | .3033 | .552 | .3184 |
| .502 | .3039 | .554 | .3189 |
| .504 | .3045 | .556 | .3195 |
| .558 | .3201 | .614 | .3359 |
| .560 | .3207 | .616 | .3365 |
| .562 | .3212 | .618 | .3370 |
| .564 | .3218 | .620 | .3376 |
| .566 | .3324 | .622 | .3382 |
| .568 | .3229 | .624 | .3387 |
| .570 | .3235 | .626 | .3393 |
| .572 | .3241 | .628 | .3398 |
| .574 | .3247 | .630 | .3404 |
| .576 | .3252 | .632 | .3409 |
| .578 | .3258 | .634 | .3415 |
| .580 | .3264 | .636 | .3420 |
| .582 | .3269 | .638 | .3426 |
| .584 | .3275 | .640 | .3431 |
| .586 | .3281 | .642 | .3437 |
| .588 | .3286 | .644 | .3442 |
| .590 | .3292 | .646 | .3448 |
| .592 | .3298 | .648 | .3453 |
| .594 | .3303 | .650 | .3459 |
| .596 | .3309 | .652 | .3464 |
| .598 | .3314 | .654 | .3470 |
| .600 | .3320 | .656 | .3475 |
| .602 | .3326 | .658 | .3481 |
| .604 | .3331 | .660 | .3486 |
| .606 | .3337 | .662 | .3492 |
| .608 | .3342 | .664 | .3497 |
| .610 | .3348 | .666 | .3503 |
| .612 | .3354 | .668 | .3508 |
| .670 | .3514 | | |
| .672 | .3519 | | |
| .674 | .3524 | | |
| .676 | .3530 | | |
| .678 | .3535 | | |
| .680 | .3541 | | |
| .682 | .3546 | | |
| .684 | .3552 | | |
| .686 | .3557 | | |
| .688 | .3562 | | |
| .690 | .3568 | | |
| .692 | .3573 | | |
| .694 | .3579 | | |
| .696 | .3584 | | |
| .698 | .3589 | | |
| .700 | .3595 | | |

3. In a dark-field, vertically-illuminated microscope objective having an effective power of 20×, a numerical aperture of 0.50, and a working distance of 1.586 mm the improvement comprising an annular reflector for providing substantially uniform object illumination having the following parameters.

TABLE III

| Axial Distance from Object (Inches) | Axial Radius to Reflecting Surface (Inches) | Axial Distance from Object (Inches) | Axial Radius to Reflecting Surface (Inches) |
|---|---|---|---|
| 0.066 | 0.2288 | 0.116 | 0.2626 |
| .068 | .2302 | .118 | .2638 |
| .070 | .2316 | .120 | .2651 |
| .072 | .2331 | .122 | .2664 |
| .074 | .2345 | .124 | .2676 |
| .076 | .2359 | .126 | .2688 |
| .078 | .2373 | .128 | .2701 |
| .080 | .2387 | .130 | .2713 |
| .082 | .2401 | .132 | .2725 |
| .084 | .2415 | .134 | .2738 |
| .086 | .2429 | .136 | .2750 |
| .088 | .2442 | .138 | .2762 |
| .090 | .2456 | .140 | .2774 |
| .092 | .2469 | .142 | .2786 |
| .094 | .2483 | .144 | .2798 |
| .096 | .2496 | .146 | .2810 |
| .098 | .2509 | .148 | .2822 |
| .100 | .2522 | .150 | .2834 |
| .102 | .2536 | .152 | .2845 |
| .104 | .2549 | .154 | .2857 |
| .106 | .2562 | .156 | .2869 |
| .108 | .2575 | .158 | .2881 |
| .110 | .2588 | .160 | .2892 |
| .112 | .2600 | .162 | .2904 |
| .114 | .2613 | .164 | .2915 |
| 0.166 | 0.2927 | 0.216 | 0.3209 |
| .168 | .2939 | .218 | .3220 |
| .170 | .2950 | .220 | .3231 |

TABLE III-continued

| Axial Distance from Object Inches | Axial Radius to Reflecting Surface Inches | Axial Distance from Object Inches | Axial Radius to Reflecting Surface Inches |
|---|---|---|---|
| .172 | .2962 | .222 | .3242 |
| .174 | .2973 | .224 | .3253 |
| .176 | .2985 | .226 | .3263 |
| .178 | .2996 | .228 | .3274 |
| .180 | .3008 | .230 | .3285 |
| .182 | .3019 | .232 | .3296 |
| .184 | .3031 | .234 | .3306 |
| .186 | .3042 | .236 | .3317 |
| .188 | .3053 | .238 | .3328 |
| .190 | .3064 | .240 | .3338 |
| .192 | .3076 | .242 | .3349 |
| .194 | .3087 | .244 | .3359 |
| .196 | .3098 | .246 | .3370 |
| .198 | .3110 | .248 | .3380 |
| .200 | .3121 | .250 | .3391 |
| .202 | .3132 | .252 | .3401 |
| .204 | .3143 | .254 | .3412 |
| .206 | .3154 | .256 | .3422 |
| .208 | .3165 | .258 | .3432 |
| .210 | .3176 | .260 | .3443 |
| .212 | .3187 | .262 | .3453 |
| .214 | .3198 | .264 | .3463 |
| 0.266 | 0.3474 | | |
| .268 | .3484 | | |
| .270 | .3494 | | |
| .272 | .3504 | | |
| .274 | .3514 | | |
| .276 | .3524 | | |
| 2.78 | .3535 | | |
| .280 | .3545 | | |
| .282 | .3555 | | |
| .284 | .3565 | | |
| .286 | .3575 | | |
| .288 | .3585 | | |
| .290 | .3595 | | |

4. In a dark-field, vertically-illuminated microscope objective having an effective power of 40×, a numerical aperture of 0.66, and a working distance of 0.654 mm the improvement comprising an annular reflector for providing substantially uniform object illumination having the following parameters.

TABLE IV

| Axial Distance from Object Inches | Axial Radius to Reflecting Surface Inches | Axial Distance from Object Inches | Axial Radius to Reflecting Surface Inches |
|---|---|---|---|
| 0.024 | 0.2299 | 0.074 | 0.2710 |
| .026 | .2317 | .076 | .2725 |
| .028 | .2335 | .078 | .2740 |
| .030 | .2353 | 0.80 | .2755 |
| .032 | .2370 | .082 | .2770 |
| .034 | .2387 | .084 | .2784 |
| .036 | .2404 | .086 | .2799 |
| .038 | .2422 | .088 | .2814 |
| .040 | .2438 | .090 | .2828 |
| .042 | .2455 | .092 | .2843 |
| .044 | .2472 | .094 | .2857 |
| .046 | .2488 | .096 | .2872 |
| .048 | .2505 | 0.98 | .2886 |
| .050 | .2521 | .100 | .2900 |
| .052 | .2538 | .102 | .2914 |
| .054 | .2554 | .104 | .2929 |
| .056 | .2570 | .106 | .2943 |
| .058 | .2586 | .108 | .2957 |
| .060 | .2601 | .110 | .2971 |
| .062 | .2617 | .112 | .2985 |
| .064 | .2633 | .114 | .2998 |
| .066 | .2648 | .116 | .3012 |
| .068 | .2664 | .118 | .3026 |
| .070 | .2679 | .120 | .3040 |
| .072 | .2695 | .122 | .3053 |
| 0.124 | 0.3067 | 0.174 | 0.3391 |
| .126 | .3080 | .176 | .3403 |
| .128 | .3094 | .178 | .3415 |
| .130 | .3107 | .180 | .3428 |
| .132 | .3121 | .182 | .3440 |
| .134 | .3134 | .184 | .3452 |
| .136 | .3147 | .186 | .3464 |
| .138 | .3161 | .188 | .3476 |
| .140 | .3174 | .190 | .3488 |
| .142 | .3187 | .192 | .3500 |
| .144 | .3200 | .194 | .3512 |
| .146 | .3213 | .196 | .3524 |
| .148 | .3226 | .198 | .3536 |
| .150 | .3239 | .200 | .3548 |
| .152 | .3252 | .202 | .3560 |
| .154 | .3265 | .204 | .3572 |
| .156 | .3277 | .206 | .3584 |
| .158 | .3290 | .208 | .3595 |
| .160 | .3303 | | |
| .162 | .3316 | | |
| .164 | .3328 | | |
| .166 | .3341 | | |
| .168 | .3353 | | |
| .170 | .3366 | | |
| .172 | .3378 | | |

* * * * *

UNITED STATES PATENT AND TRADEMARK OFFICE
CERTIFICATE OF CORRECTION

PATENT NO. : 4,160,578
DATED : July 10, 1979
INVENTOR(S) : Nathan Gottlieb et al It is certified that error appears in the above-identified patent and that said Letters Patent are hereby corrected as shown below:

In Claim 1, column 10, line 11, please change ".959" to -- .956 --.

In Claim 2, column 11, line 32, please change ".2701" to -- .2702 --.

Also in Claim 2, column 11, line 34, please change ".2661" to -- .2861 --.

Signed and Sealed this

Sixteenth Day of October 1979

[SEAL]

Attest:

RUTH C. MASON
Attesting Officer

LUTRELLE F. PARKER
Acting Commissioner of Patents and Trademarks